| United States Patent [19]
Freitag et al.

[11] 3,909,495
[45] Sept. 30, 1975

[54] RESOL RESINS PREPARED FROM DIHYDROXYDIISOPROPYLBENZENE

[75] Inventors: Dieter Freitag, Krefeld; Hans Rudolph, Krefeld-Bockum; Clemens Niehaus; Rolf Küchenmeister, both of Krefeld, all of Germany

[73] Assignee: Bayer Aktiengesellschaft, Germany

[22] Filed: Apr. 15, 1974

[21] Appl. No.: 461,216

[30] Foreign Application Priority Data
Apr. 19, 1973 Germany............................ 2320009
Aug. 10, 1973 Germany............................ 2340558

[52] U.S. Cl..... 260/51 R; 117/132 BF; 260/33.4 R; 260/839; 260/842; 260/831
[51] Int. Cl.².................... C08G 8/20; C08G 8/24
[58] Field of Search.................................. 260/51 R

[56] References Cited
UNITED STATES PATENTS
3,393,244   7/1968   Broderick et al............... 260/619
3,422,067   1/1969   Barton et al..................... 260/51
3,758,597   9/1973   Buysch et al.................... 260/51 R FOREIGN PATENTS OR APPLICATIONS
1,573,573   7/1969   France
2,107,915   8/1972   Germany OTHER PUBLICATIONS
Chem. Abstracts, Vol. 78, 1973, 31577h, Freitag et al.

*Primary Examiner*—Howard E. Schain
*Attorney, Agent, or Firm*—Connolly and Hutz

[57] ABSTRACT

A process for the production of resols by the condensation reaction of formaldehyde, or formaldehyde donors, with a condensation resin at pH value >7 which has a phenolic OH-group content of from 6.2 to 8.5 % by weight and which has been obtained by reacting a mixture consisting of $\alpha,\alpha'$-dihydroxy-1,3-diisopropyl benzene and $\alpha,\alpha'$-dihydroxy-1,4-diisopropyl benzene in proportions by weight of from 70 : 30 to 30 : 70, with phenol or p-, m- or p-cresol or cresol mixtures in the presence of acids of phosphorus.

14 Claims, No Drawings

RESOL RESINS PREPARED FROM DIHYDROXYDIISOPROPYLBENZENE

This invention relates to resol resins obtained of certain condensation resins of α,α'-dihydroxy-diisopropyl benzenes with phenols and of formaldehyde and their production.

Phenol-formaldehyde resins have been known for a long time. There are two types of phenol-formaldehyde resins, namely, the acid-condensed and the alkaline-condensed resins. The terms "novolaks" and "resols" have been introduced by Baekeland to distinguish between them (Kunststoff-Handbuch Volume X, Duroplaste).

By the term novolaks is meant resins, no containing methylol groups, which are prepared by acid condensation and always with an excess of phenol. Resols, on the other hand, are resins, containing free methylol groups, which harden when heated and which are prepared by alkaline condensation with an excess of formaldehyde.

Baekeland also introduced the terms A-, B- and C-state referring to resols to indicate that the resin may change from the A-state. (resol), in which it is fusible and soluble, to the B-state, (resitol), in which it is insoluble, rubber-like but capable of swelling in solvents, and, finally, to the C-state, (resite), in which it is an infusible, insoluble solid.

In the hardened state, phenol-formaldehyde resins are used in large quantities for many different purposes because of their excellent resistance to organic solvents, dilute acids and alkalis. They may be used as, e.g. protective coatings for metal and wood, foams, with a fine pore structure, for insulating purposes, casting resins, moulding compounds, wire coverings, and adhesives and for impregnating fabrics. Despite their wide applications, the convention phenol-formaldehyde resins are unsuitable for many purposes because of certain disadvantages, e.g. they have a tendency to form darkly coloured films and they are very brittle.

In order to achieve a phenol resin film which will be sufficiently elastic to be deep-drawn, it is customary to apply and stove, not the pure phenol resins, but mixtures of phenol resins with at least 50% of an epoxide resin, e.g. Shell's Epikote 1007. The epoxide resin content, however, has a deleterious effect on the general resistance to steam at 121°C (sterilisation test), especially on the resistance to corrosive agents, e.g. acids, sodium chloride and substances which split off sulphur.

Among the polyhydroxy arylenes, bisphenol A has achieved some importance in the production of resites which are lighter in colour than resites based on phenol. But even by using bisphenol A, it is not possible to obtain resites' films on metal surfaces which are colourless and are capable of being sterilised.

German Offenlegungsschrift No. 2,107,915 discloses the use of α,α'-bis-(hydroxyphenyl)-diisopropyl benzenes for producing colourless resites. Metal sheets which have been coated with these resites may be formed, e.g. stamped or deep-drawn, and then heated to 121°C in a steam atmosphere for 30 minutes without the lacquer film becoming detached i.e. sterilisable. However, the known tendency of phenol resins to form craters is also observed in these resol films.

This invention relates to resols obtained by the condensation reaction of formaldehyde, or formaldehyde donors, with a condensation resin at pH value greater 7, which has a phenolic hydroxyl group content of from 6.2 to 8.5% by weight and which has been obtained by reacting a mixture consisting of α,α'-dihydroxy-1,3-diisopropyl benzene and α,α'-dihydroxy-1,4-diisopropyl benzene, in proportions, by weight, of from 70 : 30 to 30 : 70, with phenol or o-, m- or p-cresol or cresol mixtures in the presence of acids of phosphorus.

The invention also relates to resites produced from the inventive resols by hardening. The resols produced in accordance with the present invention are eminently suitable for lacquering metal parts. After conventional stoving, cross-linked, colourless films which may easily be formed are obtained, (resites). These films also have the particular advantage that they form a surface on metal which is for a phenol resin surprisingly smooth and practically free from craters. Furthermore, these films have a very improved resistance to corrosive agents e.g. compounds which split off sulphur, acids and sodium chloride, in the sterilisation test at 121°C.

The resols of the present invention may be prepared by heating the above-mentioned condensation resin in an alcohol, e.g. methanol, ethanol, propanol, butanol, isopropanol or isobutanol, with a solution prepared from 30 to 35% aqueous formaldehyde, or formaldehyde donors, e.g. paraformaldehyde, and a basic catalyst. Alternatively, the catalyst may be added during, rather than before, the heating of the alcoholic condensation resin solution with the formaldehyde.

The reaction temperature employed is from 30° to 140°C, preferably from 50° to 117°C.

The reaction time depends on the reaction temperature and the amount of catalyst used. It is generally from 10 minutes to 48 hours. The proportion, by weight, of formaldehyde (100%) to condensation resin may be from 1 : 8 to 1 : 1. Suitable basic catalysts are, e.g. lithium hydroxide, potassium hydroxide, sodium hydroxide, calcium hydroxide, ammonia, sodium hydroxide together with sodium formate, sodium carbonate, potassium carbonate, barium hydroxide, and also any mixtures thereof. Water-soluble amines, e.g. dimethyl ethanolamine, are also suitable catalysts. The amount of catalyst used may be from 0.01 to 2.5 mol per 350 g of condensation resin.

It is also possible to prepare the inventive resols by condensing said condensation resins with formaldehyde in an aqueous or aqueous alcoholic medium without the addition of basic catalysts, e.g. sodium hydroxide. This is because the sodium phosphate, which is produced by the neutralisation of the phosphoric acid in the course of the preparation of the condensation resin and which remains in the reaction mixture, is sufficient to catalyse the formation of resol if the reaction time employed for reacting the condensation resin, (which has been obtained from α,α'-dihydroxy-diisopropyl benzenes and phenols with a phenolic OH-group content of from 6.2 to 8.5% by weight) with formaldehyde, or formaldehyde donors is increased compared with the corresponding alkaline condensation reaction.

According to this embodiment, therefore, the resols are prepared from the condensation resin and formaldehyde, or formaldehyde donors, in the aqueous-alcoholic solution at a pH-value greater than 7.0, preferably from 7.5 to 9.0.

This process, being carried out without the addition of a basic catalyst, avoids the formation of a salt which is inevitably produced by the neutralisation of the basic catalyst in the process described above. This preparation being carried out without the additional use of a basic catalyst, may therefore be regarded as particularly harmless to the environment.

All the operating conditions mentioned above e.g. the reaction temperature, proportions by weight of formaldehyde to condensation resin, solvents and diluents may be kept unchanged with the exception of the reaction time. The reaction time is increased so that the proportion of time required for the reaction catalysed with an additional base to the time required for the reaction without an additional basic catalyst is from 1 : 6 to 1 : 24, and the reaction time is in fact generally from 1 to 48 hours.

The reaction mixture is very simple to work-up. It may be neutralised with a dilute acid, e.g. sulphuric acid, hydrochloric acid, phosphoric acid, benzoic acid, acetic acid, carbonic acid or lactic acid, and then concentrated by evaporation or, alternatively, the organic phase may be separated, after the addition of water, and then concentrated by evaporation under vacuum until it has the desired viscosity.

To harden the resol to the resite, a solution of the resol, with or without the addition of an epoxide resin, e.g. Shell's Epikote 1007, in a convention lacquer carrier, e.g. methanol, butanol, isobutanol, benzene/butanol, ethyl acetate, xylene, ethyl glycol acetate or methyl ethyl ketone, is applied to a metal surface as a thin film. The conventional additives to improve the flow and spread of the solution may be added. An insoluble lacquer, having the above-mentioned properties, may then be obtained by heating to from 100° to 300°C, preferably from 120° to 200°C. Hardening may also be carried out in the presence of catalytic amounts of acids, e.g. hydrochloric acid, phosphoric acid, oxalic acid, p-toluene sulphonic acid, boric acid and lactic acid. The resol may also be hardened in the form of a mixture with melamine resins, polyester resins or polycarbonates, with or without the addition of acid.

The resols of the present invention are suitable for producing blocks, panels, rods, pipes and sections, (application as casting resins), and foams. Moulded products may also be produced from these resols under the action of heat and pressure, with or without the addition of fillers.

The resols of the present invention may also be used advantageously in the other fields of application of resol resins of phenol. Furthermore, the resites of the present invention are eminently suitable for electro-insulating purposes.

The resins used as starting materials in the preparation of the resols of the present invention may be prepared as follows: $\alpha,\alpha'$-dihydroxy-diisopropyl benzenes are reacted with phenols, at temperatures of from 70° to 270°C, in the presence of acids of phosphorus as catalysts. Suitable $\alpha,\alpha'$-dihydroxy-diisopropyl benzenes are mixtures consisting of $\alpha,\alpha'$-dihydroxy-1,3-diisopropyl benzene and $\alpha,\alpha'$-dihydroxy-1,4-diisopropyl benzene in proportions, by weight of from 70:30 to 30:70.

The phenols used are those which contain at least two free ortho- or para-positions, e.g. phenol, o-, p- and m-cresol, m-isopropyl phenol, 3,5-xylenol, 3,5-diisopropyl phenol and also mixtures thereof.

Suitable catalysts are the acids of phosphorus, for example orthophosphoric acid, metaphosphoric acid, pyrophosphoric acid, phosphorous acid and hypophosphorous acid. Although these are the preferred acids, phosphoric acids which are substituted with organic groups, e.g. phenyl- and alkyl-phosphoric acids, as well as partly esterified acids of phosphorus, e.g. monophenyl phosphate or monocresyl phosphate, and acid salts of phosphoric acids, e.g. ammonium dihydrogen phosphate or sodium dihydrogen phosphate, are also effective. The amount of catalyst used may vary from 0.01 to 10%, by weight, preferably from 0.05 to 5%, by weight, based on the whole reaction mixture. The molar ratio in which the reactants are employed is not particularly critical, provided that the phenolic reactant is always used in excess. The molar ratio of phenols to dihydroxy-diisopropyl benzenes used is from 4 : 1 to 15 : 1. If ratios outside these limits may be employed, the products are more difficult to work-up.

The reaction temperature employed is from 70° to 270°C, preferably from 80° to 220°C.

The process may be carried out, simply, by boiling the reaction mixture under reflux, either in the presence of the water of cendensation or after its removal by azeotropic distillation. The reaction time is not critical, it is from 1 to 8 hours, preferably from 2 to 5 hours. The reaction may be carried out with or without solvent and is advantageously carried out under an inert gas, e.g. nitrogen, as protection against oxidation.

After condensation, the catalyst is neutralised, for example by the addition of an equivalent quantity of sodium or potassium hydroxide solution. This neutralised reaction mixture may be condensed with formaldehyde without any further addition of an alkaline catalyst or may be isolated before the reaction with formaldehyde. This isolation of the condensation resins is suitable carried out by distilling off the excess phenol under reduced pressure.

EXAMPLE 1 (a)

16.95 kg 49% aqueous sodium hydroxide solution are dissolved in 97.1 kg 30% aqueous formaldehyde solution at from 60° to 70°C. This solution is pumped into a solution of 72 kg of condensation resin, (phenolic OH-content 7.5%, prepared from a mixture of 60 parts $\alpha,\alpha'$-dihydroxy-1,3-diisopropyl benzene and 40 parts, by weight, of $\alpha,\alpha'$-dihydroxy-1,4-diisopropyl benzene and phenol in the presence of phosphoric acid) in 145.5 kg butanol in the course of 10 minutes at 90°C. Stirring is then continued at from 90° to 93°C for 30 minutes. When the reaction mixture has cooled to approximately 40°C, a solution of 10.1 kg concentrated phosphoric acid in 150 kg water is added and the phases are then separated at approximately 40°C. The organic phase is then washed with water and concentrated by evaporation. Approximately 128 kg of a from 63 to 70% resol resin solution are obtained.

Preparation of the condensation resin may be carried out as follows:

A mixture of 116 g, (0.6 mol), $\alpha,\alpha'$-dihydroxy-m-diisopropyl benzene, 78 g, (0.4 mol), $\alpha,\alpha'$-dihydroxy-p-diisopropyl benzene, 752 g, (8 mol), phenol and 10 ml 85% phosphoric acid is heated to a reaction temperature of 80°C under reduced pressure with stirring. The water liberated is distilled off at the same time. After a reaction time of 2 hours, the water is removed and a pressure of 25 mm.Hg is obtained. After a further 6 hours, 8.8 ml concentrated sodium hydroxide solution are added and the phenol is distilled off at a pressure of 10 mm.Hg and a temperature of 210°C. The residue is dissolved in toluene and the solution is then freed from the salt formed by suction filtration. After evaporation, 262 g of a clear, pale hard resin is obtained which has a phenolic OH-content of 7.5% and a colour index of 0.

EXAMPLE 1 (b)

200 g 30% formalin are added to a solution of 278 g condensation resin, (phenolic OH-content 8%, prepared from a mixture of 60 parts $\alpha,\alpha'$-dihydroxy-1,3-diisopropyl benzene and 40 parts $\alpha,\alpha'$-dihydroxy-1,4-diisopropyl benzene and phenol, in the presence of phosphoric acid, neutralised with sodium hydroxide at the end of the reaction) and 556 g butanol, at a pH of from 8 to 9. The mixture is then heated to from 91° to 93°C for 8 hours. After the addition of 200 g water, the reaction mixture is adjusted to pH 4 (with a few drops of phosphoric acid) to facilitate phase separation and the lower (aqueous phase) is removed at 60°C. After separation of the phases at 60°C, the organic phase is dehydrated by azeotropic distillation and then concentrated to the desired solids content by evaporation and filtered.

Yield: 530 g 60% resol resin in butanol.

Approximately 310 g butanol are recovered by distillation.

benzene are used instead of 210 g of condensation resin. The procedure is otherwise the same as in Example 2.

Yield: 348 g of a 72% resol resin solution.

EXAMPLE 5

139 g of condensation resin, (the same composition as the starting material used in Example 1), are dissolved in 370 ml butanol. A solution of 6.8 g sodium formate in 100 g 30% aqueous formaldehyde solution is then added dropwise and the mixture is heated to 90°C. A solution of 2 g sodium hydroxide in 10 ml water is added rapidly. The reaction mixture is then maintained at from 90° to 95°C for a further 30 minutes, and then cooled and neutralised with 10% aqueous phosphoric acid. The organic phase is separated off, washed with water and concentrated by evaporation. 272 g of a 60% resol resin solution are obtained.

Hardening of the resols (from 60% solutions in butanol) to resites and properties of the resites:

Stoving conditions:

12 minutes at 180°C with the addition of 0.5% 10% phosphoric acid and 3% of Maprenal NP

|  | Using the product according to: Example | | | | | Using a resol resin of: | |
|---|---|---|---|---|---|---|---|
|  | 1a, | 1b, | 1a, | 1b | 2 | phenol | bisphenol A |
| ratio resol:epoxide resin 1007 (manufactured by Shell) | 2:1 | 2:1 | 1:1 | 1:1 | 1:1 | 1:1 | 1:1 |
| Thickness of layer g/m² | 5.6 | 5.6 | 6.3 | 6.3 | 5.35 | 5.0 | 5.08 |
| Deep-drawing property (*) | 1 | 1 | 0/1 | 0/1 | 0/1 | 2 | 4 |
| Sterilisation test (**) | + | + | + | + | + | + | — |
| Yellowing (***) | 0 | 0 | 0 | 0 | 0 | 3 | 1 |

(*) the lower the figure obtained, the more satisfactory is the property
(**) + means that the requirement is fulfilled — means that the requirement is not fulfilled
(***) 0 = colourless 4 = deep yellow

EXAMPLE 2

53.9 g 45% aqueous sodium hydroxide solution are dissolved in 242.9 g 35% aqueous formaldehyde solution at 60°C. This solution is added dropwise, in the course of 2 minutes at 100°C, to a solution of 210 g of condensation resin, (phenolic OH-content 6.7%, prepared from a mixture of 70 parts of $\alpha,\alpha'$-dihydroxy-1,3-diisopropyl benzene and 30 parts of $\alpha,\alpha'$-dihydroxy-1,4-diisopropyl benzene and phenol in the presence of phosphoric acid), in 530 ml butanol. The mixture is left to react for 30 minutes at from 90° to 100°C, and then cooled and neutralised with phosphoric acid. The phases are then separated and the organic phase is concentrated by evaporation. 465 g of a 60% resol resin solution are obtained.

EXAMPLE 3 (COMPARISON)

210 g $\alpha,\alpha'$-bis-(4-hydroxyphenyl)-1,3-diisopropyl benzene are used instead of 210 g of condensation resin. The procedure is otherwise the same as in Example 2.

Yield: 300 g of an 82% resol resin solution.

EXAMPLE 4 (COMPARISON)

210 g $\alpha,\alpha'$-bis-(4-hydroxyphenyl)-1,4-diisopropyl

Surface of the film after roller application of the butanolic solution of resol to a metal sheet and stoving at 180°C, (12 minutes):

Product according to Example 1a, 1b    ml/g1
Product according to Example 2    ml/g2
Product according to Example 3    disturbance in
(comparison Example)    flow
Product according to Example 4    m4/g3
(comparison Example)
m denotes number of craters
g denotes size of craters
The lower the figure obtained, the smaller are the number and size of the craters.

We claim:
1. A process for producing a resol which comprises condensing formaldehyde or a formaldehyde donor with a condensation resin at a pH greater than 7, said condensation resin having a phenolic OH-group content of from 6.2 to 8.5% by weight and having been obtained by reacting a mixture consisting of $\alpha,\alpha'$-dihydroxy-1,3-diisopropylbenzene and $\alpha,\alpha'$-dihydroxy-1,4-diisopropylbenzene in a proportion by weight of from 70:30 to 30:70 with phenol, o-cresol, m-cresol, p-cresol or a cresol mixture in the presence of an acid of phosphorus and then neutralizing said acid of phospho- rus by the addition of a sodium or potassium hydroxide solution.

2. The process as claimed in claim 1, wherein said condensation is carried out in the presence of a basic catalyst.

3. The process as claimed in claim 2 wherein said basic catalyst is present in amounts of from 0.01 to 2.5 g mol per 350 g of said condensation resin.

4. The process as claimed in claim 2 wherein said basic catalyst is lithium hydroxide, potassium hydroxide, sodium hydroxide, calcium hydroxide, ammonia, sodium hydroxide together with sodium formate, sodium carbonate, potassium carbonate, barium hydroxide, or any mixture thereof.

5. The process as claimed in claim 2 wherein said basic catalyst is a water-soluble amine.

6. The process as claimed in claim 5, wherein said catalyst is dimethyl ethanolamine.

7. The resol obtained by the process as claimed in claim 1.

8. The resol obtained by the process as claimed in claim 2.

9. The process as claimed in claim 1, wherein said condensation is carried out without the addition of a basic catalyst.

10. The process as claimed in claim 1, wherein said condensation is carried in an aqueous or aqueous alcoholic medium.

11. The process as claimed in claim 9, wherein the pH is from 7.5 to 9.0.

12. The process as claimed in claim 9, wherein the reaction time for said addition is from 1 to 48 hours.

13. The resol obtained by the process as claimed in claim 9.

14. The process as claimed in claim 1, wherein the proportion, by weight, of formaldehyde (100%), to said condensation resin is from 1 : 8 to 1 : 1.

* * * * *